(12) United States Patent
Yamada et al.

(10) Patent No.: US 11,826,834 B1
(45) Date of Patent: Nov. 28, 2023

(54) CUTTING TOOL

(71) Applicant: SUMITOMO ELECTRIC HARDMETAL CORP., Hyogo (JP)

(72) Inventors: Kento Yamada, Osaka (JP); Hironari Moroguchi, Osaka (JP); Yusuke Matsuda, Osaka (JP); Satoru Kukino, Hyogo (JP)

(73) Assignee: SUMITOMO ELECTRIC HARDMETAL CORP., Hyogo (JP)

( * ) Notice: Subject to any disclaimer, the term of this patent is extended or adjusted under 35 U.S.C. 154(b) by 0 days.

(21) Appl. No.: 18/029,394

(22) PCT Filed: Jul. 21, 2022

(86) PCT No.: PCT/JP2022/028382
§ 371 (c)(1),
(2) Date: Mar. 30, 2023

(51) Int. Cl.
*B23B 27/14* (2006.01)

(52) U.S. Cl.
CPC ........ *B23B 27/148* (2013.01); *B23B 2222/14* (2013.01); *B23B 2222/44* (2013.01); *B23B 2226/125* (2013.01)

(58) Field of Classification Search
CPC .......... B23B 2226/125; B23B 2250/18; B23B 27/148; B23B 27/141; B23B 27/14; B23B 2222/14
See application file for complete search history.

(56) References Cited

U.S. PATENT DOCUMENTS

2019/0054545 A1   2/2019   Harada et al.
2020/0230705 A1   7/2020   Sasaki

FOREIGN PATENT DOCUMENTS

| EP | 2540421 A1 * | 1/2013 | ............. B23C 5/202 |
|---|---|---|---|
| JP | 1-101704 U1 | 7/1989 | |
| JP | 10-217006 A | 8/1998 | |
| JP | 2002-126914 A | 5/2002 | |
| WO | 2018/116524 A1 | 6/2018 | |
| WO | 2019/065397 A1 | 4/2019 | |
| WO | 2021/260778 A1 | 12/2021 | |

* cited by examiner

*Primary Examiner* — Alan Snyder
(74) *Attorney, Agent, or Firm* — Renner, Otto, Boisselle & Sklar, LLP

(57) ABSTRACT

A cutting tool, including a cutting edge portion composed of a cubic boron nitride sintered material, wherein the cutting edge portion has: a flank face; a rake face contiguous to the flank face; and a cutting edge positioned on a ridgeline of the flank face and the rake face, an arithmetical mean height Sa of the flank face is 0.5 μm or more and 3.0 μm or less, the Sa is measured in accordance with ISO25178-2:2012, and an oxygen concentration of the flank face is 10 mass % or more and 50 mass % or less.

8 Claims, 6 Drawing Sheets

CUTTING TOOL

TECHNICAL FIELD

The present disclosure relates to a cutting tool.

BACKGROUND ART

Conventionally used for cutting process is a cutting tool having: a flank face; a rake face contiguous to the flank face; and a cutting edge positioned on a ridgeline of the flank face and the rake face (PTL 1).

CITATION LIST

Patent Literature

PTL 1: Japanese Patent Laying-Open No. 2002-126914

SUMMARY OF INVENTION

A cutting tool of the present disclosure comprises a cutting edge portion composed of a cubic boron nitride sintered material, wherein
the cutting edge portion has: a flank face; a rake face contiguous to the flank face; and a cutting edge positioned on a ridgeline of the flank face and the rake face,
an arithmetical mean height Sa of the flank face is 0.5 µm or more and 3.0 µm or less,
the Sa is measured in accordance with ISO25178-2:2012, and
an oxygen concentration of the flank face is 10 mass % or more and 50 mass % or less.

DETAILED DESCRIPTION

Figure 1:
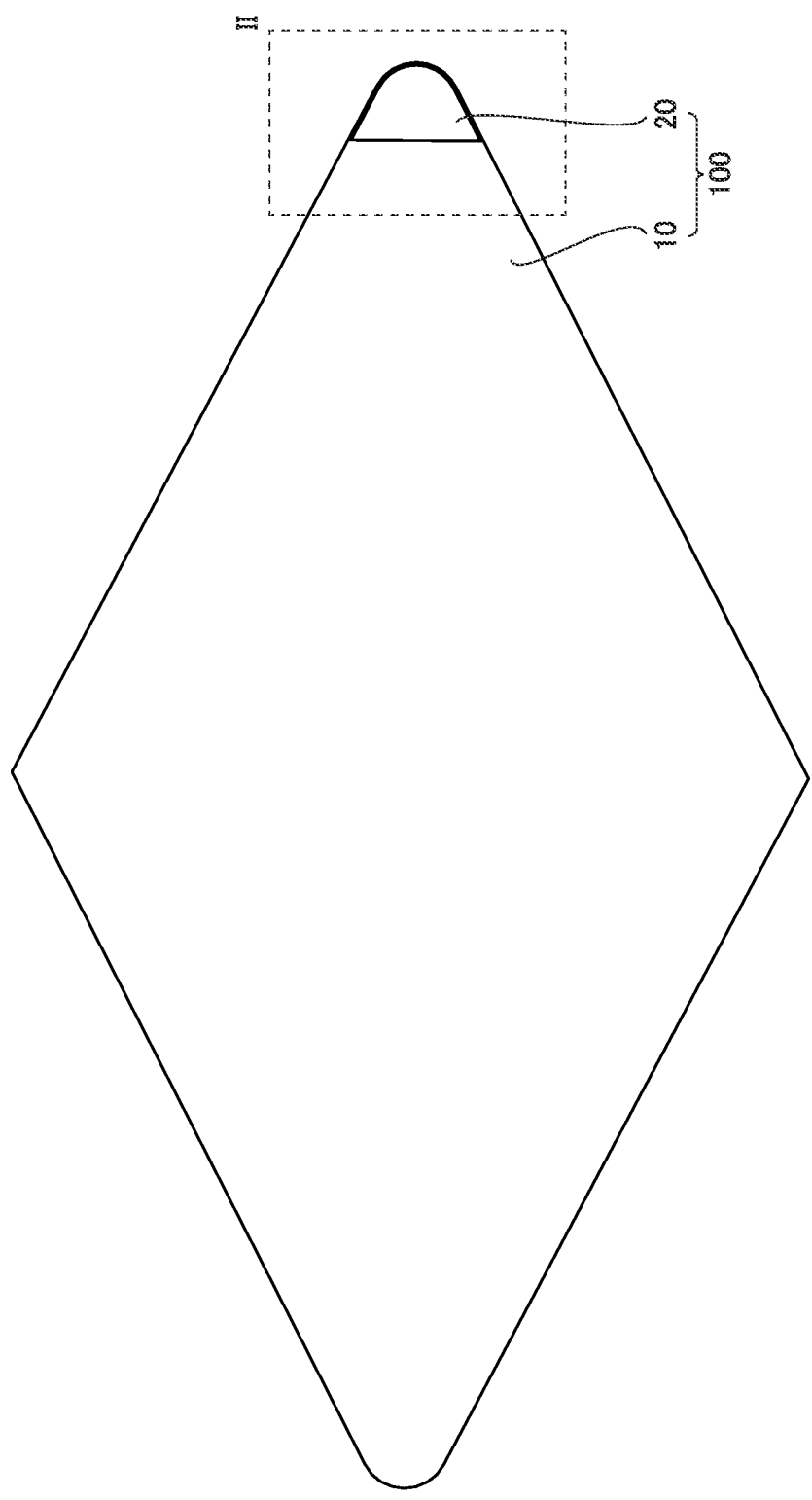
FIG. 1 is a plan view of a cutting tool 100.

Problem to be Solved by the Present Disclosure

In recent years, requirement for high-efficiency process has been rapidly growing. In particular, in cutting process of cast iron, a flank face of a cutting tool is scratched by a hard particle present on a surface of a workpiece material (cast iron), and mechanical wearing of the cutting tool may easily expand. In addition, when the cutting tool has a cutting edge portion composed of a cubic boron nitride sintered material, compatibility between a component of the workpiece material (cast iron) and a component of the cubic boron nitride sintered material is high, and thus wear by welding of the cutting tool may easily expand. Thus, in the high-efficiency process of cast iron, in particular, improvement of the wearing resistance and extension of a tool lifetime are required.

Advantageous Effect of the Present Disclosure

According to the present disclosure, a cutting tool that has a long tool lifetime can be provided even in the high-efficiency process of cast iron particularly.

DESCRIPTION OF EMBODIMENTS

First, the aspect of the present embodiment will be listed and described.

(1) A cutting tool of the present disclosure comprises a cutting edge portion composed of a cubic boron nitride sintered material, wherein
the cutting edge portion has: a flank face; a rake face contiguous to the flank face; and a cutting edge positioned on a ridgeline of the flank face and the rake face,
an arithmetical mean height Sa of the flank face is 0.5 µm or more and 3.0 µm or less, where the Sa is measured in accordance with ISO25178-2.2012, and
an oxygen concentration of the flank face is 10 mass % or more and 50 mass % or less.

According to the present disclosure, a cutting tool that has a long tool lifetime can be provided even in the high-efficiency process of cast iron particularly.

(2) It is preferable that a skewness Ssk of the flank face be −1.0 or more and 1.0 or less, and the Ssk is preferably measured in accordance with ISO25178-3:2012. Accordingly, a cutting tool that has a longer tool lifetime can be provided even in the high-efficiency process of cast iron particularly.

(3) It is preferable that the cubic boron nitride sintered material contain: 30 vol % or more and 95 vol % or less of a cubic boron nitride particle; and a binder,
the binder have an aluminum compound, and
an oxygen concentration in the cubic boron nitride sintered material be less than 10 mass %. Accordingly, a cutting tool that has a longer tool lifetime can be provided even in the high-efficiency process of cast iron particularly.

(4) It is preferable that the arithmetical mean height Sa of the rake face be 0.5 µm or less. Accordingly, a cutting tool that has a longer tool lifetime can be provided even in the high-efficiency process of cast iron particularly.

Detail of the Present Embodiments

With reference to the drawings, a specific example of a cutting tool of an embodiment of the present disclosure (hereinafter, also referred to as "the present embodiment") will be described hereinafter. In the drawing of the present disclosure, the same reference sign represents the same portion or a corresponding portion. Dimensions such as length, width, thickness, and depth are appropriately modified to clarify and simplify the drawings, and do not always represent actual dimensions.

A recitation "A to B" herein means an upper and lower limits of a range (that is, A or more and B or less). When A without a unit and only B with a unit, the unit of A is the same as the unit of B.

When a compound or the like are represented by a chemical formula herein, it encompasses those with any conventionally known atomic ratios unless the atomic ratio is particularly limited, and should not be necessarily limited to an atomic ratio within a stoichiometric range. For example, when "AlN" is described, the ratio between numbers of atoms constituting AlN includes any conventionally known atomic ratios.

Embodiment 1: Cutting Tool

With reference to FIG. 1 to FIG. 7, a cutting tool according to an embodiment of the present disclosure will be described.

An embodiment of the present disclosure (hereinafter, also referred to as "the present embodiment") comprises a cutting edge portion 20 composed of a cubic boron nitride sintered material, wherein
  cutting edge portion 20 has: a flank face 22; a rake face 21 contiguous to flank face 22; and a cutting edge 23 positioned on a ridgeline of flank face 22 and rake face 21,
  an arithmetical mean height Sa of flank face 22 is 0.5 μm or more and 3.0 μm or less,
  the Sa is measured in accordance with ISO25178-2:2012, and
  an oxygen concentration of flank face 22 is 10 mass % or more and 50 mass % or less.

According to the present disclosure, a cutting tool 100 that has a long tool lifetime can be provided even in the high-efficiency process of cast iron particularly. It is presumed that the reason is as follows.
  (a) The arithmetical mean height Sa of flank face 22 is 0.5 μm or more. Accordingly, aluminum derived from a workpiece material (cast iron) is easily trapped by flank face 22 of cutting tool 100 in cutting process of cast iron, which results from roughness generated on flank face 22 of cutting tool 100. As a result, belag of aluminum oxide ($Al_2O_3$), which includes aluminum as a constituent element, is easily formed on a surface of flank face 22 of the cutting tool. Thus, in the cutting process of cast iron, the wearing resistance of cutting tool 100 is improved by the belag.
  (b) As noted above, since the arithmetical mean height Sa of flank face 22 is 0.5 μm or more, the belag is easily formed on the surface of flank face 22 of cutting tool 100 and the wearing resistance of cutting tool 100 is thus improved. However, when the arithmetical mean height Sa of flank face 22 is too high, wear locally occurs in a projections and the wearing resistance is easily reduced. In cutting tool 100 of the present disclosure, the arithmetical mean height Sa of flank face 22 is 3.0 μm or less. Accordingly, excessive increase in cutting force on flank face 22 of cutting tool 100 can be prevented, whereby the wearing resistance of cutting tool 100 is improved.
  (c) The oxygen concentration of flank face 22 is 10 mass % or more and 50 mass % or less. Accordingly, aluminum trapped by flank face 22 of cutting tool 100 is easily oxidized, and as a result, the belag of aluminum oxide ($Al_2O_3$) is easily formed. Thus, in the cutting process of cast iron, the wearing resistance of cutting tool 100 is improved by the belag generated on the surface of the flank face of cutting tool 100.

According to the present disclosure, the wearing resistance of cutting tool 100 can be thus improved even in the high-efficiency process of cast iron particularly, whereby cutting tool 100 that has a long tool lifetime can be provided.

(Constitution of Cutting Tool According to Embodiment)

Hereinafter, a constitution of the cutting tool according to the embodiment (hereinafter, referred to as "cutting tool 100") will be described.

Figure 2:
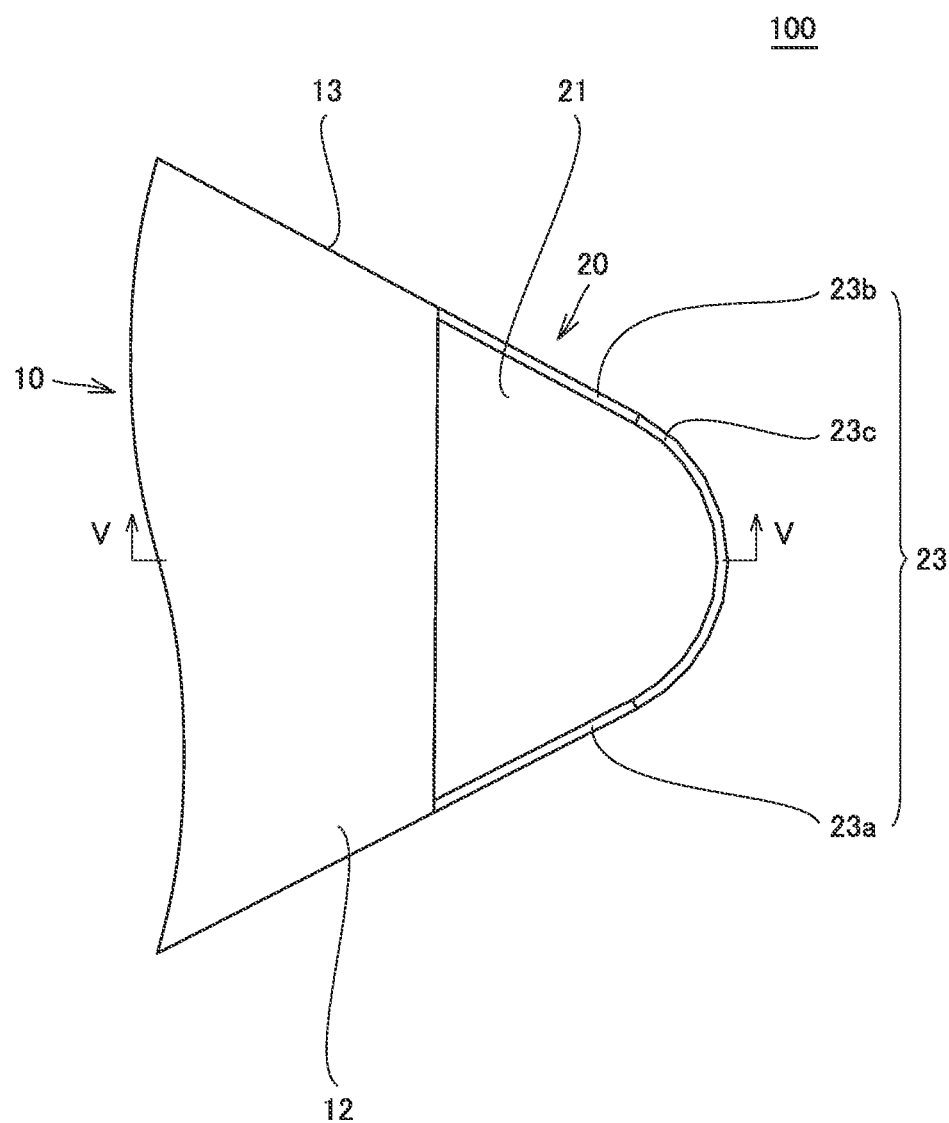
FIG. 2 is an enlarged view of the region II in FIG. 1.
Figure 3:
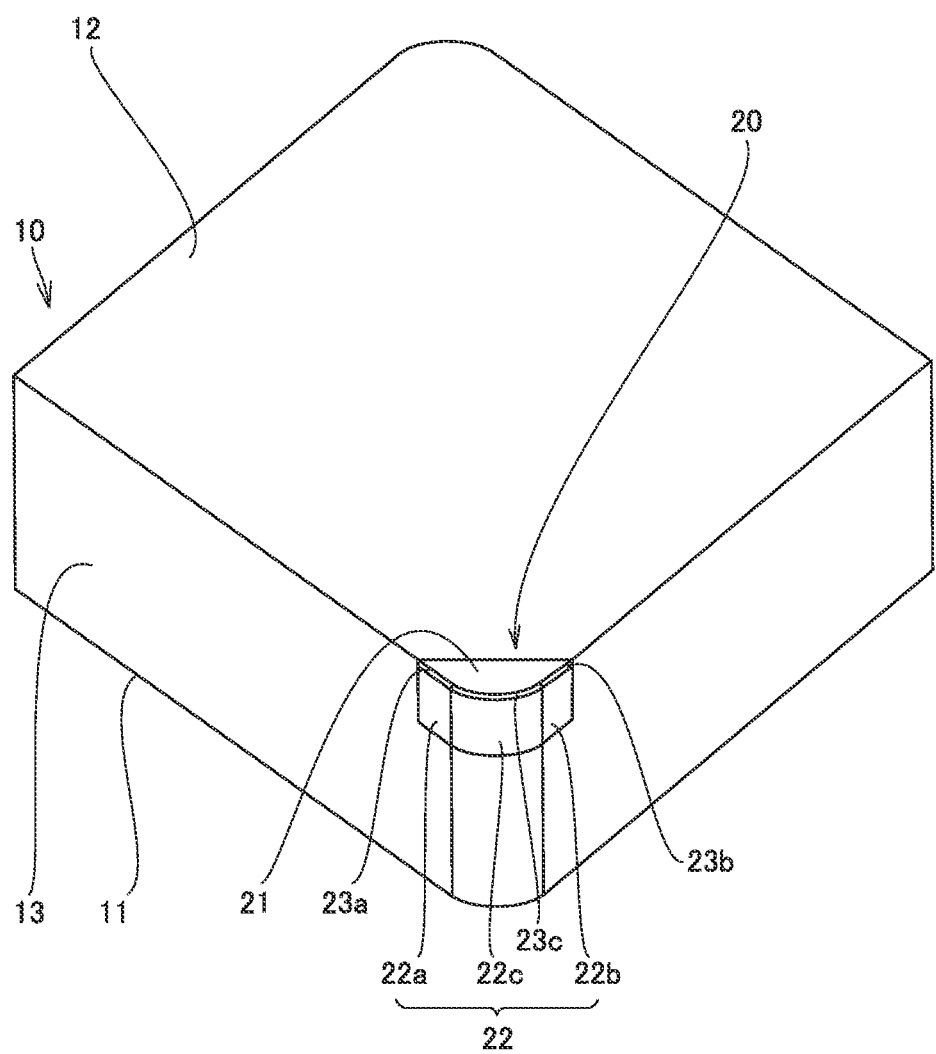
FIG. 3 is a perspective view of cutting tool 100.

FIG. 1 is a plan view of cutting tool 100. FIG. 2 is an enlarged view of the region II in FIG. 1. FIG. 3 is a perspective view of cutting tool 100. As illustrated in FIG. 1, FIG. 2, and FIG. 3, cutting tool 100 has a main body 10 and a cutting edge portion 20. Here, "a cutting tool has a main body and a cutting edge portion" is a concept that encompasses not only a case where the cutting edge portion (cBN sintered material) is brazed to a main body (cemented carbide) but also a case where an entirety of the cutting tool is made of a cubic boron nitride sintered material (solid type).

Figure 4:
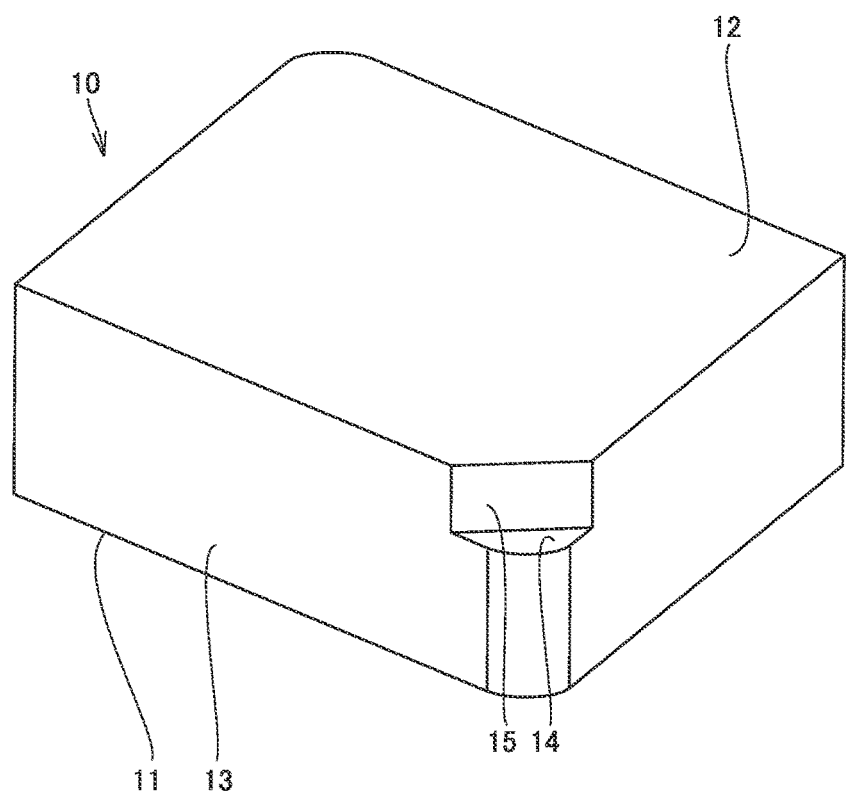
FIG. 4 is a perspective view of a main body 10.
Figure 5:
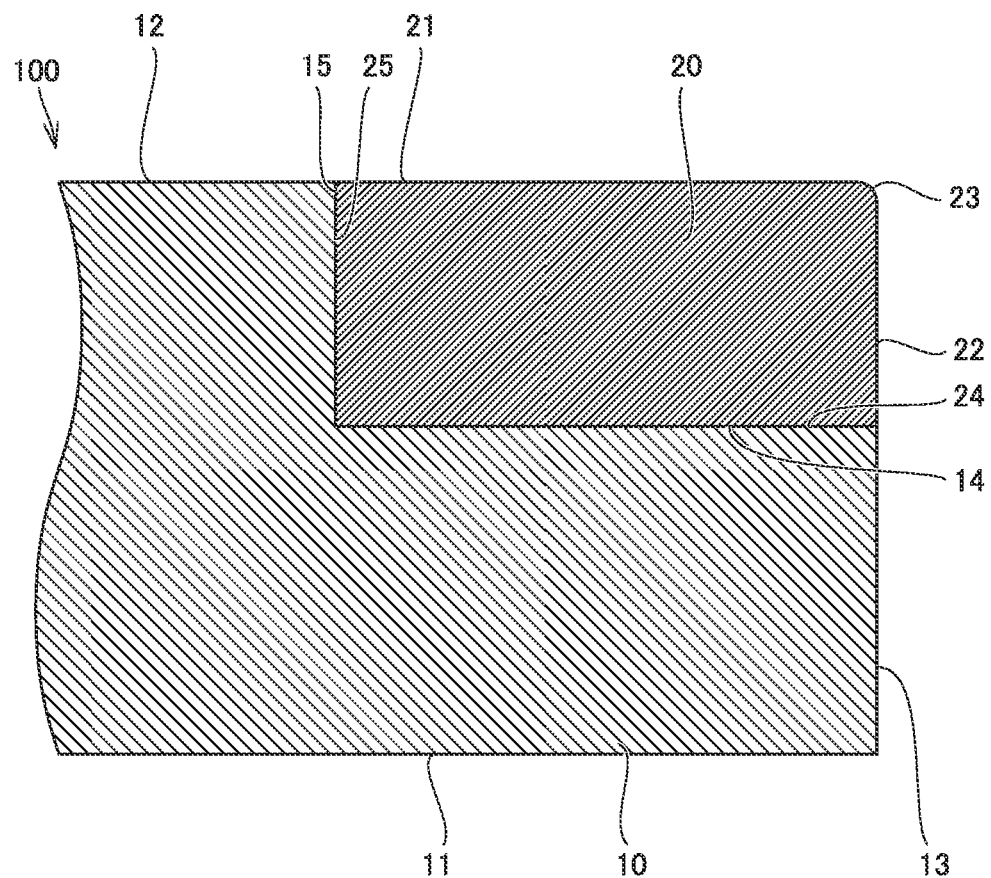
FIG. 5 is a sectional view along the V-V line in FIG. 2.

Main body 10 is formed of, for example, cemented carbide. FIG. 4 is a perspective view of main body 10. As illustrated in FIG. 4, main body 10 has a bottom face 11, a top face 12, and a side face 13. Top face 12 is a face opposite to bottom face 11. Side face 13 is contiguous to bottom face 11 and top face 12. Bottom face 11, top face 12, and side face 13 are a bottom face of cutting tool 100, a top face of cutting tool 100, and a side face of cutting tool 100, respectively.

Main body 10 has a rhomboid shape in planar view (when viewed from a direction perpendicular to top face 12) (see FIG. 1). The "rhomboid shape" herein also includes a case where a corner part of main body 10 in planar view is rounded.

The shape of main body 10 in planar view is not limited to the rhomboid shape. The shape of main body 10 in planar view may be a quadrangle shape, or may be a triangle shape. The "quadrangle shape" and the "triangle shape" herein each also include a case where a corner part of main body 10 in planar view is rounded.

Top face 12 includes a seat face 14 and a support face 15. Seat face 14 is positioned at a corner of main body 10 in planar view. A distance between seat face 14 and bottom face 11 is smaller than a distance between top face 12, other than seat face 14, and bottom face 11. In other words, a step is formed between seat face 14 and top face 12, other than seat face 14. Support face 15 extends in a direction from bottom face 11 to top face 12, and is contiguous to seat face 14 and top face 12, other than seat face 14.

<<Cutting Edge Portion>>
<Structure of Cutting Edge Portion>

As illustrated in FIG. 3, cutting edge portion 20 has: flank face 22; rake face 21 contiguous to flank face 22; and cutting edge 23 positioned on a ridgeline of flank face 22 and rake face 21. Cutting edge portion 20 further has a bottom face 24 and a supported face 25 (see FIG. 5). On a side opposite to rake face 21, flank face 22 is contiguous to side face 13. Flank face 22 is contiguous to rake face 21 and bottom face 24.

Flank face 22 has a first flank face 22a, a second flank face 22b, and a third flank face 22c. First flank face 22a and second flank face 22b are a plane face. Third flank face 22c is a curved face. Third flank face 22c is positioned between first flank face 22a and second flank face 22b, and contiguous to both of first flank face 22a and second flank face 22b.

Cutting edge 23 is formed on the ridgeline of rake face 21 and flank face 22. Cutting edge 23 is, for example, roundly honed. Cutting edge 23 has a first cutting edge 23a, a second cutting edge 23b, and a third cutting edge 23c. First cutting edge 23a is formed on a ridgeline of rake face 21 and first flank face 22a, and second cutting edge 23b is formed on a ridgeline of rake face 21 and second flank face 22b. Third cutting edge 23c is formed on a ridgeline of rake face 21 and third flank face 22c.

First cutting edge 23a and second cutting edge 23b linearly extend in planar view. Third cutting edge 23c is contiguous to first cutting edge 23a at one end, and contiguous to second cutting edge 23b at the other end. Third cutting edge 23c curvedly extends with projected toward outside of cutting tool 100 in planar view. In other words, an imaginary line that connects one end of third cutting edge 23c and the other end of third cutting edge 23c passes above rake face 21.

The cutting edge portion on the surface of flank face 22 preferably has no coating film in view of regulating the arithmetical mean height Sa of the flank face, the skewness Ssk of the flank face, and the oxygen concentration of the flank face within respective desired ranges.

(Structure of Flank Face)

The arithmetical mean height Sa of flank face 22 is 0.5 μm or more and 3.0 μm or less. The Sa is measured in accordance with ISO25178-2:2012. Here, "arithmetical mean height Sa" is a parameter when arithmetical mean roughness Ra (arithmetical mean height of a line) is expanded to a plane, and indicates an average of absolute values of differences in heights at each point relative to an average face of a surface. Due to this, the wearing resistance of cutting tool 100 can be improved even in the high-efficiency process of cast iron particularly. In view of the lower limit, the arithmetical mean height Sa of flank face 22 is preferably 0.8 μm or more, more preferably 1.0 μm or more, and further preferably 1.2 μm or more. In view of the upper limit, the arithmetical mean height Sa of flank face 22 is preferably 2.8 μm or less, more preferably 2.6 μm or less, and further preferably 2.4 μm or less. The arithmetical mean height Sa of flank face 22 is preferably 0.8 μm or more and 2.8 μm or less, more preferably 1.0 μm or more and 2.6 μm or less, and further preferably 1.2 μm or more and 2.4 μm or less.

Figure 6:
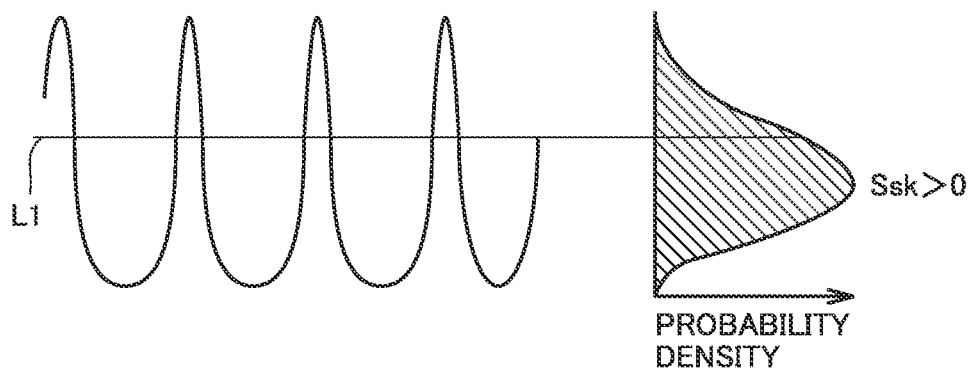
FIG. 6 is a view that illustrates a relationship between surface roughness and a skewness.
Figure 7:
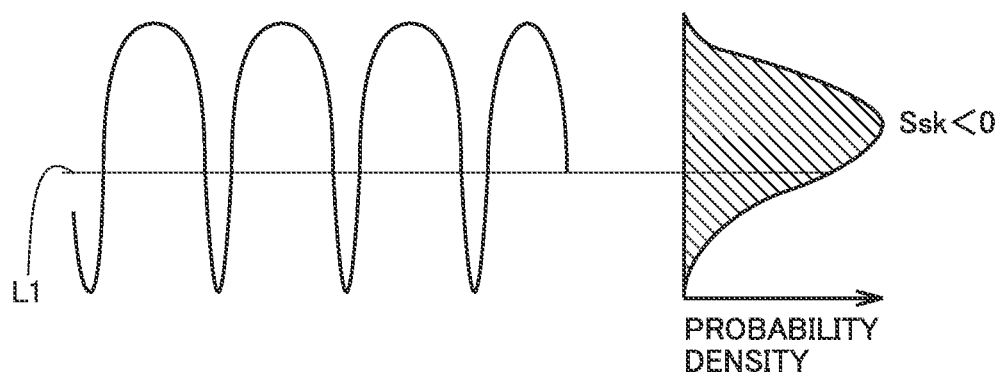
FIG. 7 is a view that illustrates another relationship between surface roughness and a skewness.

The skewness Ssk of flank face 22 is preferably −1.0 or more and 1.0 or less. The Ssk is measured in accordance with ISO25178-3:2012. Here, "skewness Ssk" means a skewness of a roughness curve, and is a parameter that indicates a degree of skew between a crest part and a trough part of a face. In other words, "skewness" is an indicator that indicates a symmetric property between the crest part and the trough part with an average line L1 as a center, as illustrated in FIG. 6 and FIG. 7. When the plane is partial to the lower side relative to the average line L1, "skewness" is a positive value (FIG. 6). On the other hand, when the plane is partial to the upper side relative to the average line L1, "skewness" is a negative value (FIG. 7). When a distribution curve of a probability density illustrated in FIG. 6 and FIG. 7 is a normal distribution, the skewness becomes "0". Since the skewness Ssk of flank face 22 is −1.0 or more and 1.0 or less, aluminum derived from cast iron is easily trapped evenly on the surface of flank face 22 of the cutting tool in cutting process. Thus, the belag of aluminum oxide ($Al_2O_3$) that has a constituent element of the aluminum is easily formed evenly on the surface of flank face 22 of cutting tool 100 in cutting process. As a result, the wearing resistance of cutting tool 100 is further improved. The skewness Ssk of flank face 22 is preferably −0.9 or more and 0.9 or less, more preferably −0.8 or more and 0.8 or less, and further preferably −0.7 or more and 0.7 or less.

The arithmetical mean height Sa and the skewness Ssk are measured on flank face 22 in the surface of cutting tool 100 using a laser microscope ("OPTELICS HYBRID"™, manufactured by Lasertec Corporation) in accordance with ISO25178-2:2012 and ISO25178-3:2012. Specifically, a part of flank face 22 in the surface of cutting tool 100 that is involved in cutting (in other words, a region within a distance of 1 mm from the cutting edge ridgeline (that is, the ridgeline of flank face 22 and rake face 21)) is firstly specified as a measurement field, and five rectangular fields each with 200 μm×200 μm are randomly set. Then, in each of the five measurement fields, the arithmetical mean height and the skewness are measured. Then, an average value of the found arithmetical mean heights and an average value of the found skewnesss are calculated to obtain the arithmetical mean height Sa and the skewness Ssk. An arithmetical mean height Sa of rake face 21, described later, can also be determined in the same manner as above, except that the measurement is carried out on rake face 21 in the surface of cutting tool 100.

(Structure of Rake Face)

The arithmetical mean height Sa of rake face 21 is preferably 0.5 μm or less. Accordingly, occurrence of welding due to the high compatibility between the component of the workpiece material and the component of the cubic boron nitride sintered material is easily prevented in cutting process, whereby the resistance of rake face 21 of cutting tool 100 against the wear by welding can be improved. When the welding of the rake face is prevented, deterioration in cutting quality with change in a rake angle due to the welding can be prevented, whereby the resistance of the flank face against the wearing can be improved. Thus, the wearing resistance of cutting tool 100 can be further improved. In terms of the lower limit, the arithmetical mean height Sa of rake face 21 is preferably 0.05 μm or more, more preferably 0.08 μm or more, and further preferably 0.10 μm or more. In terms of the upper limit, the arithmetical mean height Sa of rake face 21 is preferably 0.28 μm or less, more preferably 0.26 μm or less, and further preferably 0.24 μm or less. The arithmetical mean height Sa of rake face 21 is preferably 0.05 μm or more and 0.5 μm or less, more preferably 0.08 μm or more and 0.28 μm or less, and further preferably 0.10 μm or more and 0.26 μm or less. The arithmetical mean height Sa of rake face 21 is also preferably 0.1 μm or more and 0.5 μm or less.

<Composition of Cutting Edge Portion>

Cutting edge portion 20 is composed of a cubic boron nitride (cBN) sintered material. Here, "composed of a cubic boron nitride sintered material" is a concept that encompasses not only a case where cutting edge portion 20 consists of the cubic boron nitride sintered material but also a case where cutting edge portion 20 contains the cubic boron nitride sintered material and a component other than the cubic boron nitride sintered material (for example, an inevitable impurity) as long as the effect of the present disclosure is exhibited. Examples of the inevitable impurity include carbon (C), aluminum (Al), silicon (Si), lithium (Li), calcium (Ca), and magnesium (Mg). The content of the inevitable impurity in cutting edge portion 20 can be, for example, 0% or more and 1% or less on a mass basis. The content of the inevitable impurity in cutting edge portion 20 is measured by inductively coupled plasma (ICP) emission spectroscopy (measurement device: "ICPS-8100"™, SHIMADZU CORPORATION).

(Cubic Boron Nitride Sintered Material)

The cubic boron nitride sintered material preferably contains 30 vol % or more and 95 vol % or less of a cubic boron nitride particle. Accordingly, the cubic boron nitride sintered material can have a larger hardness, whereby the cutting tool according to the present embodiment can have more excellent wearing resistance. The cubic boron nitride sintered material preferably contains 40 vol % or more, more preferably 50 vol % or more, further preferably 60 vol % or more, of the cubic boron nitride particle. The cubic boron nitride sintered material preferably contains 93 vol % or less, more preferably 90 vol % or less, further preferably 88 vol % or less, of the cubic boron nitride particle. The cubic boron nitride sintered material preferably contains 40 vol % or more and 93 vol % or less, more preferably 50 vol % or more and 90 vol % or less, further preferably 60 vol % or more and 88 vol % or less, of the cubic boron nitride particle. Here, "cubic boron nitride particle" means a particle composed of cubic boron nitride (cBN). The cubic boron nitride particle can contain the inevitable impurity as long as the effect of the present disclosure is exhibited.

The cubic boron nitride sintered material preferably contains a binder. The cubic boron nitride sintered material preferably contains 5 vol % or more, more preferably 7 vol % or more, further preferably 10 vol % or more, of the binder. The cubic boron nitride sintered material preferably contains 70 vol % or less, more preferably 60 vol % or less, further preferably 50 vol % or less, of the binder. The cubic boron nitride sintered material preferably contains 5 vol % or more and 70 vol % or less, more preferably 7 vol % or more and 60 vol % or less, further preferably 10 vol % or more and 50 vol % or less, of the binder. The cubic boron nitride sintered material can contain the inevitable impurity in addition to the cubic boron nitride sintered particle and the binder. The cubic boron nitride sintered material can be composed of the cubic boron nitride sintered particle and the binder, or the cubic boron nitride sintered material can be composed of the cubic boron nitride sintered particle, the binder, and the inevitable impurity.

In the cubic boron nitride sintered material, the content of the cubic boron nitride particle and the content of the binder can be determined by formulation observation, elemental analysis, and the like of the cBN sintered material, using an energy dispersive X-ray spectrometer (EDX) (Octane Elect EDS System) equipped with a scanning electron microscope (SEM) ("JSM-7800F" (product name), manufactured by JEOL Ltd.) (hereinafter, also referred to as "SEM-EDX"). The specific measurement method is as follows.

(A1) First, the cBN sintered material is cut at a random position to produce a specimen including a cross section of the cBN sintered material. For producing the cross section, a focused ion-beam apparatus, a cross section polisher, and the like can be used. Then, the cross section is observed with the SEM with 1000 times magnification to obtain a backscattered electron image. In the backscattered electron image, a region where the cBN particle is present is a black region, and a region where the binder is present is a gray region and/or a white region.

(B1) Then, the backscattered electron image is subjected to a binarization using an image analysis software ("WinROOF", MITANI CORPORATION). In the binarized image, the region where the cBN particle is present (the black region in the backscattered electron image) is a dark field, and the region where the binder is present (the gray region and/or the white region in the backscattered electron image) is a light field. In the binarized image, a measurement region (70 μm×100 μm) is set. An area ratio of pixels derived from the dark field (pixels derived from the cBN particle, pixels derived from the black region in the backscattered electron image) to the entire area of the measurement region is calculated. The found area ratio is regarded in vol %, and the content (vol %) of the cBN particle can be thus determined.

(C1) From the binarized image, an area ratio of pixels derived from the light field (pixels derived from the binder, a total of pixels derived from the gray region and the white regions in the backscattered electron image) to the entire area of the measurement region is calculated, and the content (vol %) of the binder can be determined.

Note that, it has been confirmed that, as long as the same cutting edge portion is measured by the above method, the measurement results have no variation even with randomly changing the measurement portion.

(Binder)

The binder preferably has an aluminum compound. Accordingly, the belag of aluminum oxide ($Al_2O_3$) is easily formed on the cutting tool surface during the cutting. Thus, in the cutting process of cast iron, the wearing resistance of cutting tool 100 is improved by the belag generated on the surface of cutting tool 100, and therefore the cutting tool according to the present embodiment can have more excellent wearing resistance. Whether "the binder has an aluminum compound" can be checked by X-ray diffraction (XRD). In other words, "the binder has an aluminum compound" means that the aluminum compound is present in the binder at a degree detectable by XRD.

Examples of the aluminum compound include aluminum nitride (AlN), aluminum oxide ($Al_2O_3$), aluminum oxynitride (AlON), and aluminum boride ($AlB_2$). In view of increase in the bonding force with the cubic boron nitride, the aluminum compound particularly preferably contains aluminum nitride (AlN).

The content of the aluminum compound in the binder is preferably 5 vol % or more and 70 vol % or less. Accordingly, the belag of aluminum oxide ($Al_2O_3$) is easily formed on the cutting tool surface during the cutting. Thus, in the cutting process of cast iron, the wearing resistance of cutting tool 100 is improved by the belag generated on the surface of cutting tool 100, and therefore the cutting tool according to the present embodiment can have more excellent wearing resistance. In terms of the lower limit, the content of the aluminum compound in the binder is preferably 7 vol % or more, more preferably 10 vol % or more, and further preferably 12 vol % or more. In terms of the upper limit, the content of the aluminum compound in the binder is preferably 60 vol % or less, more preferably 50 vol % or less, and further preferably 40 vol % or less. The content of the aluminum compound in the binder is preferably 7 vol % or more and 60 vol % or less, more preferably 10 vol % or more and 50 vol % or less, and further preferably 12 vol % or more and 40 vol % or less. The content of the aluminum compound in the binder can be determined by a reference intensity ratio (RIR) with XRD.

The binder can contain a component other than the aluminum compound, in addition to the aluminum compound. Examples of the component other than the aluminum compound include a simple substance of one element selected from the group consisting of the group 4 elements, the group 5 elements, the group 6 elements, aluminum, silicon, iron, cobalt, and nickel. Examples of the component other than the aluminum compound also include an alloy of two or more elements selected from the group consisting of the group 4 elements, the group 5 elements, the group 6 elements, aluminum, silicon, iron, cobalt, and nickel. Examples of the component other than the aluminum compound also include an intermetallic compound of two or more elements selected from the group consisting of the group 4 elements, the group 5 elements, the group 6 elements, silicon, iron, cobalt, and nickel. Examples of the component other than the aluminum compound also include a compound composed of: one element selected from the group consisting of the group 4 elements, the group 5 elements, the group 6 elements, silicon, iron, cobalt, and nickel; and at least one element selected from the group consisting of nitrogen, carbon, boron, and oxygen. Examples of the component other than the aluminum compound include titanium nitride (TiN), tungsten carbide (WC), cobalt (Co), titanium boride (TiB$_2$), titanium carbide (TiC), chromium nitride (CrN), silicon nitride (Si$_3$N$_4$), iron (Fe), and nickel (Ni). In the binder in the cubic boron nitride sintered material, a kind of the compound other than the aluminum compound can be identified by X-ray diffraction (XRD).

(Oxygen Concentration)

The oxygen concentration of the flank face is 10 mass % or more and 50 mass % or less. Accordingly, aluminum trapped by the flank face of the cutting tool is easily oxidized in the cutting process, and as a result, the belag of aluminum oxide (Al$_2$O$_3$) is easily formed. Thus, in the cutting process of cast iron, the wearing resistance of the cutting tool can be improved by forming the belag on the surface of the flank face of the cutting tool. In terms of the lower limit, the oxygen concentration of the flank face is preferably 15 mass % or more, more preferably 20 mass % or more, and further preferably 25 mass % or more. In terms of the upper limit, the oxygen concentration of the flank face is preferably 45 mass % or less, more preferably 40 mass % or less, and further preferably 35 mass % or less. The oxygen concentration of the flank face is preferably 15 mass % or more and 45 mass % or less, more preferably 20 mass % or more and 40 mass % or less, and further preferably 25 mass % or more and 35 mass % or less.

The oxygen concentration of the flank face can be determined by elemental analysis of the flank face using SEM-EDX. The specific measurement method is as follows.

(A2) First, a part of the flank face involved in cutting (in other words, a region within a distance of 1 mm from the cutting edge ridgeline (that is, the ridgeline of flank face 22 and rake face 21)) is observed with an SEM with 5000 times magnification to obtain a backscattered electron image.

(B2) Then, arbitrary one measurement region (15 μm×20 μm) in the backscattered electron image is subjected to energy dispersive X-ray spectroscopy for determining mass % of oxygen (O) element to obtain an oxygen concentration (mass %) in the any one region. The same analysis as above is carried out on other four measurement regions (15 μm×20 μm).

(C2) An average value of the oxygen concentrations in the total five portions is calculated to determine the oxygen concentration (mass %) of the flank face.

Note that, it has been confirmed that, as long as the same cutting edge portion is measured by the above method, the measurement results have no variation even with randomly changing the measurement portion.

The oxygen concentration in the cubic boron nitride sintered material is preferably less than 10 mass %. As noted above, since the oxygen concentration of the flank face is 10 mass % or more and 50 mass % or less, the wearing resistance of the cutting tool is improved by forming the belag on the surface of the flank face of the cutting tool in the cutting process of cast iron. However, since oxygen is mainly present in a binder phase in the cubic boron nitride sintered material, the cubic boron nitride sintered material itself is brittle to easily result in brittleness of the cutting tool, if the oxygen concentration in the binder phase is too high. Thus, an oxygen concentration in the cubic boron nitride sintered material less than 10 mass % can inhibit the increase in brittleness of the cutting tool caused by too high oxygen concentration in the cubic boron nitride sintered material. The oxygen concentration in the cubic boron nitride sintered material is more preferably 9.9 mass % or less, further preferably 9.8 mass % or less, further preferably 9.5 mass % or less, further more preferably less than 8 mass %, and particularly preferably less than 6 mass %. The oxygen concentration in the cubic boron nitride sintered material can be 0.5 mass % or more, 1 mass % or more, or 1.5 mass % or more, in view of the manufacturing method.

The oxygen concentration in the cubic boron nitride sintered material can be determined by elemental analysis using SEM-EDX. The specific measurement method is as follows.

(A3) First, a plane surface produced by 100 μm polishing any surface (either or both of the surface of the flank face and the surface of the rake face) of the cubic boron nitride sintered material is observed with an SEM with 5000 times magnification to obtain a backscattered electron image.

(B3) Then, the oxygen concentration in the cubic boron nitride sintered material can be determined by the method same as in B2 to C2.

Note that, it has been confirmed that, as long as the same cubic boron nitride sintered material is measured by the above method, the measurement results have no variation even with randomly changing the measurement portion.

Embodiment 2: Method for Manufacturing Cutting Tool

The cutting tool of the present embodiment can be manufactured by: a first step of providing a cutting tool precursor having a cutting edge portion composed of a cubic boron nitride sintered material; and a second step of surface-treatment processing a flank face of the cutting edge portion, in this order. Hereinafter, each step will be described.

<<First Step>>

This step is a step of providing the cutting tool precursor having the cutting edge portion composed of the cubic boron nitride sintered material. The cubic boron nitride sintered material can be obtained by a conventionally known method. For example, a cBN particle (raw material) and a raw material powder to constitute the binder phase are placed in a vessel made of cemented carbide with ethanol, and mixed and crushed by a ball-mill mixing method for 20 hours to obtain a mixed powder. Subsequently, the mixed powder is filled into a vessel made of Ta (tantalum) and vacuum-sealed therein. The vacuum-sealed mixed powder is maintained under a condition of 3 to 9 GPa and 1100 to 1900° C. for 5 to 30 minutes to be sintered, using a belt-type ultrahigh-pressure and high-temperature generator. Thus, the cubic boron nitride sintered material can be obtained. When the entirety of the cutting tool is made of the cubic boron nitride sintered material (solid type), the cubic boron nitride sintered material obtained by this method is the cutting tool precursor.

For a case where a cutting edge portion is bonded to a main body, the above cubic boron nitride sintered material is subsequently bonded to the main body via a bonding material to form the cutting tool precursor. Examples of the bonding material include silver braze.

Then, the bonding-processed cubic boron nitride sintered material and main body are cooled to solidity the melted bonding material. The bonding surface between the cubic boron nitride sintered material and the main body is polished for smoothing the bonding surface between the cubic boron nitride sintered material and the tool base material to produce the cutting tool precursor.

<<Second Step>>

This step is a step of performing electric discharge machining of the cutting tool precursor. Accordingly, the cutting tool precursor can be finished to have a shape of a cutting tool (specifically, a cutting tool comprising a cutting edge portion, wherein the cutting edge portion has: a flank face; a rake face contiguous to the flank face; and a cutting edge positioned on a ridgeline of the flank face and the rake face can be obtained.), and the arithmetical mean height Sa of the flank face of the cutting edge portion and the skewness Ssk of the flank face of the cutting tool can be regulated within the desired ranges. For example, since the flank face of the cutting edge portion of the cutting tool easily incorporates oxygen compared with a case where polishing process is performed, "the oxygen concentration of the flank face is 10 mass % or more and 50 mass % or less" can be satisfied. The above electric discharge machining can be performed by the following procedure, for example.

(1) Electric Discharge Machining

The cutting tool precursor is placed on an electric discharge machine, and treated under a condition of a no-load voltage of 50 V or more and less than 200 V. A shape of wire is preferably a curved shape corresponding to the surface to be processed, or a needle shape.

By performing the electric discharge machining, the arithmetical mean height Sa of the flank face of the cutting edge portion can be regulated to be 0.5 μm or more and 3.0 μm or less, and the oxygen concentration of the flank face can be regulated to be 10 mass % or more and 50 mass % or less. Conventionally, a cutting tool subjected to electric discharge machining has been avoided because a brittle layer is formed on the tool surface to fail to resist high stress during cutting in some cases. The present inventors have novelly found that even when the cutting tool has undergone the electric discharge machining under the above no-load voltage condition, high wearing resistance can be exhibited in the high-efficiency process of cast iron if the arithmetical mean height Sa of the flank face and the oxygen concentration of the flank face are regulated to be 0.5 μm or more and 3.0 μm or less, and 10 mass % or more and 50 mass % or less, respectively.

After the electric discharge machining is performed, ion etching can be further performed on the flank face. Thus, the arithmetical mean height Sa of the flank face and the oxygen concentration of the flank face can be further regulated. The ion etching can be performed under the following condition, for example.

(Ion Etching Condition)

Added gas: Ar or $O_2$

Acceleration voltage: 0.1 kV or more and 10 kV or less

Oxygen partial pressure: 0.001 Pa or more and 1.000 Pa or less

Time: 5 minutes or more and 120 minutes or less

<<Other Step>>

The method for manufacturing the cutting tool of the present disclosure can further include a step of performing the above polishing process on the rake face. Accordingly, the arithmetical mean height Sa of the rake face can be 0.5 μm or less. Here, the polishing process is performed with a polishing stone of #400 or more.

Examples

The present embodiment will be more specifically described with Examples. However, the present embodiment is not limited by these Examples.

<<Production of Cutting Tool>>

<First Step>

To produce cubic boron nitride sintered materials according to Samples A to I, a cBN particle (raw material) and a raw material powder of a binder were uniformly mixed at proportions on a volume basis described in Table 1, and then the mixture was filled in a capsule made of Mo (molybdenum) and molded into a predetermined shape to form a molded product. Then, the obtained molded product was sintered under a condition of temperature (° C.), pressure (GPa), and time (minutes) described in Table 1 to obtain the cubic boron nitride sintered materials according to Samples A to I. The obtained cubic boron nitride sintered materials were brazed to main bodies made of cemented carbide to prepare cutting tool precursors according to Samples 1 to 16 and 18 to 25.

<Second Step>

To obtain cutting tools according to Sample 1 to 16 and 18 to 25, the cutting tool precursors were subjected to electric discharge machining, both electric discharge machining and ion etching, or polishing process under conditions described in Table 2. For example, in Sample 1, the cutting tool precursor was placed on an electric discharge machine, and subjected to electric discharge machining under a condition of a no-load voltage of 150 V. For example, in Sample 5, the cutting tool precursor was placed on an electric discharge machine, subjected to electric discharge machining under a condition of a no-load voltage of 150 V, and the flank face was subjected to ion etching under the following condition.

(Ion Etching Condition)

Added gas: Ar

Acceleration voltage: 1 kV

Oxygen partial pressure: 0.20 Pa

Time: 15 minutes

In this way, the cutting tool precursors according to Sample 1 to 16 and 18 to 25 were molded into a predetermined shape (ISO standard: SNGN120408). The predetermined shape is a shape including a cutting edge portion, wherein the cutting edge portion has: a flank face; a rake face contiguous to the flank face; and a cutting edge positioned on a ridgeline of the flank face and the rake face.

<Other Step>

To obtain cutting tools according to Samples 1 to 16 and 18 to 25, the rake face of the cutting edge portion was subjected to electric discharge machining or polishing process under conditions described in Table 2.

TABLE 1

| Sample No. | Proportion of cBN particle (raw material) [vol %] | Proportion of raw material powder of binder [vol %] | Temperature [° C.] | Pressure [GPa] | Time [min] |
|---|---|---|---|---|---|
| A | 30 | 70 | 1200 | 5 | 30 |
| B | 80 | 20 | 1200 | 5 | 30 |
| C | 95 | 5 | 1200 | 5 | 30 |
| D | 50 | 50 | 1200 | 5 | 30 |
| E | 29 | 71 | 1200 | 5 | 30 |
| F | 96 | 4 | 1200 | 5 | 30 |

TABLE 1-continued

| Sample No. | Proportion of cBN particle (raw material) [vol %] | Proportion of raw material powder of binder [vol %] | Temperature [° C.] | Pressure [GPa] | Time [min] |
|---|---|---|---|---|---|
| G | 30 | 70 | 1200 | 5 | 30 |
| H | 80 | 20 | 1200 | 5 | 30 |
| I | 95 | 5 | 1200 | 5 | 30 |

TABLE 2

| Sample No. | cBN | Second step (flank face) Processing method | no-load voltage [V] | Gas added | Acceleration voltage [kV] | Oxygen partial pressure [Pa] | Time [min] | Other step (rake face) Processing method | no-load voltage [V] | Content of cBN particle [vol %] | Content of binder [vol %] | Composition of Binder | Content of Al compound in binder [vol %] | Oxygen concentration in sintered material [mass %] | Flank face Sa [μm] | Flank face Oxygen concentration [mass %] | Ssk | Rake face Sa [μm] | Cutting performance Amount of Wear [μm] |
|---|---|---|---|---|---|---|---|---|---|---|---|---|---|---|---|---|---|---|---|
| 1 | Sample A | Electric discharge | 150 | — | — | — | — | Electric discharge | 150 | 30 | 70 | TiN, AlN | 70 | 9.8 | 1.8 | 30 | −0.2 | 2.2 | 51 |
| 2 | Sample B | Electric discharge | 150 | — | — | — | — | Electric discharge | 150 | 80 | 20 | AlN | 100 | 4.1 | 1.9 | 50 | −0.1 | 2.1 | 41 |
| 3 | Sample C | Electric discharge | 150 | — | — | — | — | Electric discharge | 150 | 95 | 5 | WC, Co, Al$_2$O$_3$ | 5 | 1.2 | 2.1 | 28 | −0.4 | 2.3 | 48 |
| 4 | Sample B | Electric discharge | 170 | — | — | — | — | Electric discharge | 150 | 80 | 20 | AlN | 100 | 4.1 | 3.0 | 35 | 0.4 | 2.1 | 67 |
| 5 | Sample B | Electric discharge + ion etching | 120 | Ar | 1 | 0.20 | 15 | Electric discharge | 150 | 80 | 20 | AlN | 100 | 4.1 | 0.5 | 12 | −0.7 | 2.1 | 69 |
| 6 | Sample B | Electric discharge + ion etching | 100 | Ar | 1 | 0.20 | 30 | Electric discharge | 150 | 80 | 20 | AlN | 100 | 4.1 | 0.6 | 10 | 0.8 | 2.1 | 70 |
| 7 | Sample B | Electric discharge + ion etching | 170 | O$_2$ | 3 | 0.20 | 30 | Electric discharge | 150 | 80 | 20 | AlN | 100 | 4.1 | 0.8 | 31 | −0.9 | 2.1 | 68 |
| 8 | Sample B | Electric discharge + ion etching | 150 | O$_2$ | 4 | 0.01 | 90 | Electric discharge | 150 | 80 | 20 | AlN | 100 | 4.1 | 1.1 | 39 | −1.0 | 2.1 | 45 |
| 9 | Sample B | Electric discharge + ion etching | 150 | O$_2$ | 4 | 0.20 | 90 | Electric discharge | 150 | 80 | 20 | AlN | 100 | 4.1 | 0.9 | 38 | 1.0 | 2.1 | 43 |
| 10 | Sample B | Electric discharge | 150 | — | — | — | — | Polishing (#600) | — | 80 | 20 | AlN | 100 | 4.1 | 2.1 | 32 | −0.3 | 0.1 | 39 |
| 11 | Sample B | Electric discharge | 150 | — | — | — | — | Polishing (#400) | — | 80 | 20 | AlN | 100 | 4.1 | 1.8 | 31 | −0.3 | 0.5 | 48 |
| 12 | Sample A | Polishing | — | — | — | — | — | Polishing (#600) | — | 30 | 70 | TiN, AlN | 70 | 9.8 | 0.2 | 9 | 1.3 | 0.1 | 91 |
| 13 | Sample B | Polishing | — | — | — | — | — | Polishing (#600) | — | 80 | 20 | AlN | 100 | 4.1 | 0.1 | 4 | 1.2 | 0.1 | 85 |
| 14 | Sample C | Polishing | — | — | — | — | — | Polishing (#600) | — | 95 | 5 | WC, Co, Al$_2$O$_3$ | 5 | 1.2 | 0.3 | 1 | 1.4 | 0.1 | 80 |
| 15 | Sample B | Electric discharge + ion etching | 200 | O$_2$ | 4 | 0.20 | 90 | Electric discharge | 150 | 80 | 20 | AlN | 100 | 4.1 | 3.1 | 32 | 0.5 | 2.4 | 82 |
| 16 | Sample B | Electric discharge | 200 | — | — | — | — | Electric discharge | 150 | 80 | 20 | AlN | 100 | 4.1 | 3.1 | 51 | 1.4 | 2.2 | 89 |
| 18 | Sample B | Electric discharge + ion etching | 150 | O$_2$ | 4 | 0.01 | 120 | Electric discharge | 150 | 80 | 20 | AlN | 100 | 4.1 | 1.2 | 32 | 1.1 | 2.3 | 78 |

TABLE 2-continued

| Sample No. | cBN | Second step (flank face) | | | | | Other step (rake face) | | Content of cBN particle [vol %] | Content of binder [vol %] | Composition of Binder | Content of Al compound in binder [vol %] | Oxygen concentration in sintered material [mass %] | Flank face | | | Rake face Sa [μm] | Cutting performance Amount of Wear [μm] |
|---|---|---|---|---|---|---|---|---|---|---|---|---|---|---|---|---|---|---|
| | | Processing method | no-load voltage [V] | Gas added | Acceleration voltage [kV] | Oxygen partial pressure [Pa] | Time [min] | Processing method | no-load voltage [V] | | | | | | Sa [μm] | Oxygen concentration [mass %] | Ssk | | |
| 19 | Sample B | Electric discharge + ion etching | 150 | O$_2$ | 4 | 0.20 | 120 | Electric discharge | 150 | 80 | 20 | AlN | 100 | 4.1 | 1.0 | 39 | −1.1 | 2.3 | 76 |
| 20 | Sample D | Electric discharge | 150 | — | — | — | — | Electric discharge | 150 | 50 | 50 | TiC | 0 | 1.1 | 1.4 | 33 | −0.3 | 2.4 | 72 |
| 21 | Sample E | Electric discharge | 150 | — | — | — | — | Electric discharge | 150 | 29 | 71 | TiN, AlN | 70 | 9.9 | 1.1 | 31 | −0.5 | 2.2 | 75 |
| 22 | Sample F | Electric discharge | 150 | — | — | — | — | Electric discharge | 150 | 96 | 4 | WC, Co, Al$_2$O$_3$ | 5 | 1.0 | 2.2 | 27 | −0.4 | 2.3 | 73 |
| 23 | Sample G | Electric discharge | 150 | — | — | — | — | Electric discharge | 150 | 30 | 70 | CrN, AlN | 70 | 9.5 | 1.9 | 31 | −0.3 | 2.2 | 78 |
| 24 | Sample H | Electric discharge | 150 | — | — | — | — | Electric discharge | 150 | 80 | 20 | Si$_3$N$_4$, AlN | 20 | 3.2 | 2.2 | 30 | −0.2 | 2.3 | 72 |
| 25 | Sample I | Electric discharge | 150 | — | — | — | — | Electric discharge | 150 | 95 | 5 | Fe, Ni, Al$_2$O$_3$ | 5 | 1.0 | 2.3 | 21 | −0.3 | 2.4 | 76 |

The above steps were performed to produce the cutting tools of Samples 1 to 16 and 18 to 25 having features described in Table 2.

<<Evaluation>>

For the cutting tool of each Sample, measured were: the composition of the cubic boron nitride sintered material (the content of the cubic boron nitride particle and the content of the binder); the composition of the binder; the oxygen concentration in the cubic boron nitride sintered material; the arithmetical mean height Sa of the flank faces; the oxygen concentration of the flank face; the skewness Ssk of the flank face; and the arithmetical mean height Sa of the rake face.

<Determination of Composition of Cubic Boron Nitride Sintered Material (Content of Cubic Boron Nitride Particle and Content of Binder)>

For the cutting tools of Sample Nos. 1 to 16 and 18 to 25, the content of the cubic boron nitride particle was determined by the method described in Embodiment 1. Each of the obtained results is shown in "Content of cBN particle [vol %]" in Table 2. For the cutting tools of Sample Nos. 1 to 16 and 18 to 25, the content of the binder was determined by the method described in Embodiment 1. Each of the obtained results is shown in "Content of binder [vol %]" in Table 2.

<Determination of Binder Composition>

For the cutting tools of Sample Nos. 1 to 16 and 18 to 25, the composition of the binder (in other words, kinds of compounds constituting the binder) was determined by the method described in Embodiment 1. Each of the obtained results is shown in "Binder composition" in Table 2.

For the cutting tools of Sample Nos. 1 to 16 and 18 to 25, the content of the aluminum compound in the binder was determined by the method described in Embodiment 1. Each of the obtained results is shown in "Content of Al compound in binder [vol %]" in Table 2.

<Determination of Oxygen Concentration in Cubic Boron Nitride Sintered Material>

For the cutting tools of Sample Nos. 1 to 16 and 18 to 25, the oxygen concentration in the cubic boron nitride sintered material was determined by the method described in Embodiment 1. Each of the obtained results is shown in "Oxygen concentration in sintered material [mass %]" in Table 2.

<Determination of Arithmetical Mean Height Sa of Flank Face>

For the cutting tools of Sample Nos. 1 to 16 and 18 to 25, the arithmetical mean height Sa of the flank face was determined by the method described in Embodiment 1. Each of the obtained results is shown in "Sa [μm]" in "Flank face" in Table 2.

<Determination of Oxygen Concentration of Flank Face>

For the cutting tools of Sample Nos. 1 to 16 and 18 to 25, the oxygen concentration of the flank face was determined by the method described in Embodiment 1. Each of the obtained results is shown in "Oxygen concentration [mass %]" in "Flank face" in Table 2.

<Determination of Skewness Ssk of Flank Face>

For the cutting tools of Sample Nos. 1 to 16 and 18 to 25, the skewness Ssk of the flank face was determined by the method described in Embodiment 1. Each of the obtained results is shown in "Ssk" in "Flank face" in Table 2.

<Determination of Arithmetical Mean Height Sa of Rake Face>

For the cutting tools of Sample Nos. 1 to 16 and 18 to 25, the arithmetical mean height Sa of the rake face was determined by the method described in Embodiment 1. Each of the obtained results is shown in "Sa [μm]" in "Rake face" in Table 2.

<Cutting Test>

Using the cutting tools of Sample Nos. 1 to 16 and 18 to 25, cutting was performed for 20 minutes under the following cutting condition, and then the amount of wear [μm] of the flank face was measured. Each of the obtained results is shown in "Wear amount [μm]" in Table 2. A smaller amount of wear [μm] means more excellent wearing resistance of the cutting tool, and means the cutting tool having a longer tool lifetime.

(Cutting Condition)

Workpiece material: FC250 (gray cast iron)
Cutting rate: Vc=500 m/min
Feeding rate: f=0.2 mm/edge
Cutting depth: ap=1 mm
Wet/Dry: Dry This cutting condition corresponds to the high-efficiency process of cast iron.

<Result>

The cutting tools of Samples 1 to 11 and 18 to 25 correspond to Examples. Samples 12 to 16 correspond to Comparative Examples. It was confirmed that the cutting tools of Samples 1 to 11 and 18 to 25 (Examples) had excellent wearing resistance even in the high-efficiency process of cast iron and had a longer tool lifetime, compared with the cutting tools of Samples 12 to 16 (Comparative Examples).

Therefore, the cutting tools of Samples 1 to 11 and 18 to 25 was found to have a long tool lifetime even in the high-efficiency process of cast iron.

Although the embodiments and Examples of the present disclosure have been described as above, it is previously anticipated that the aforementioned constituents of each of the aforementioned embodiments and Examples are appropriately combined and variously modified.

The disclosed embodiments and Examples herein are illustrative in all points, and should be considered as non-limitative. The scope of the present invention is defined by not the above embodiments nor Examples but claims, and intended to include meaning equivalent to the claims and all modification within the scope.

REFERENCE SINGS LIST 10 main body, 11 bottom face, 12 top face, 13 side face, 14 seat face, 15 support face, 20 cutting edge portion, 21 rake face, 22 flank face, 22a first flank face, 22b second flank face, 22c third flank face, 23 cutting edge, 23a first cutting edge, 23b second cutting edge, 23c third cutting edge, 24 bottom face, 25 supported face, 100 cutting tool, L1 average line

The invention claimed is:

1. A cutting tool, comprising a cutting edge portion composed of a cubic boron nitride sintered material, wherein
the cutting edge portion has: a flank face; a rake face contiguous to the flank face; and a cutting edge positioned on a ridgeline of the flank face and the rake face,
an arithmetical mean height Sa of the flank face is 0.5 μm or more and 3.0 μm or less,
the Sa is measured in accordance with ISO25178-2:2012, and
an oxygen concentration of the flank face is 10 mass % or more and 50 mass % or less.

2. The cutting tool according to claim 1, wherein
a skewness Ssk of the flank face is −1.0 or more and 1.0 or less, and
the Ssk is measured in accordance with ISO25178-3: 2012.

3. The cutting tool according to claim 2, wherein
the cubic boron nitride sintered material contains: 30 vol % or more and 95 vol % or less of a cubic boron nitride particle; and a binder,
the binder has an aluminum compound, and
an oxygen concentration in the cubic boron nitride sintered material is less than 10 mass %.

4. The cutting tool according to claim 3, wherein the arithmetical mean height Sa of the rake face is 0.5 μm or less.

5. The cutting tool according to claim 2, wherein the arithmetical mean height Sa of the rake face is 0.5 μm or less.

6. The cutting tool according to claim 1, wherein
the cubic boron nitride sintered material contains: 30 vol % or more and 95 vol % or less of a cubic boron nitride particle; and a binder,
the binder has an aluminum compound, and
an oxygen concentration in the cubic boron nitride sintered material is less than 10 mass %.

7. The cutting tool according to claim 6, wherein the arithmetical mean height Sa of the rake face is 0.5 μm or less.

8. The cutting tool according to claim 1, wherein the arithmetical mean height Sa of the rake face is 0.5 μm or less.

* * * * *